(12) United States Patent
Beatch

(10) Patent No.: US 10,839,856 B2
(45) Date of Patent: Nov. 17, 2020

(54) SYSTEMS AND METHODS FOR GENERATING COMPILATIONS OF PHOTO AND VIDEO DATA

(71) Applicant: Kyle Quinton Beatch, Grand Cayman (KY)

(72) Inventor: Kyle Quinton Beatch, Grand Cayman (KY)

(*) Notice: Subject to any disclaimer, the term of this patent is extended or adjusted under 35 U.S.C. 154(b) by 232 days.

(21) Appl. No.: 15/452,950

(22) Filed: Mar. 8, 2017

(65) Prior Publication Data

US 2017/0263287 A1   Sep. 14, 2017

Related U.S. Application Data

(60) Provisional application No. 62/306,047, filed on Mar. 9, 2016.

(51) Int. Cl.
| | |
|---|---|
| *G11B 27/036* | (2006.01) |
| *H04N 21/2187* | (2011.01) |
| *H04N 21/218* | (2011.01) |
| *H04N 21/234* | (2011.01) |

(52) U.S. Cl.
CPC ....... *G11B 27/036* (2013.01); *H04N 21/2187* (2013.01); *H04N 21/21805* (2013.01); *H04N 21/23424* (2013.01)

(58) Field of Classification Search
CPC ........... G11B 27/036; H04N 21/21805; H04N 21/2187; H04N 21/23424
See application file for complete search history.

(56) References Cited

U.S. PATENT DOCUMENTS

| | | | | | |
|---|---|---|---|---|---|
| 2002/0196327 | A1* | 12/2002 | Rui | .................. | H04N 7/181 348/14.11 |
| 2007/0279490 | A1* | 12/2007 | Zhou | .................. | G06K 9/00771 348/143 |
| 2009/0067706 | A1* | 3/2009 | Lapa | .................. | G01C 11/025 382/154 |
| 2012/0263439 | A1* | 10/2012 | Lassman | .................. | H04N 5/76 386/280 |
| 2013/0073964 | A1* | 3/2013 | Meaney | .................. | G11B 27/34 715/716 |
| 2014/0320519 | A1* | 10/2014 | Sorkine Hornung | .................. | H04N 1/6077 345/591 |
| 2015/0281507 | A1* | 10/2015 | Konen | .................. | H04N 1/2112 348/231.6 |

(Continued)

*Primary Examiner* — Thai Q Tran
*Assistant Examiner* — Sunghyoun Park
(74) *Attorney, Agent, or Firm* — McDonnell Boehnen Hulbert & Berghoff LLP

(57) ABSTRACT

Systems and methods disclosed herein include a computing system receiving a command to generate a first video of a first activity, and in response to receiving the command to generate the first video, executing a first automated video processing procedure comprising: (i) receiving one or more live video feeds of the first activity, wherein each live video feed is obtained from a separate camera, (ii) selecting one or more of the received live video feeds for processing, (iii) for each of the selected live video feeds, modifying the selected video feed to improve performance of the first automated video processing procedure, (iv) generating a video segment based on each of the modified video feeds, and (v) compiling the one or more generated video segments into a first video of the first activity.

20 Claims, 3 Drawing Sheets

(56) References Cited

U.S. PATENT DOCUMENTS

| | | | |
|---|---|---|---|
| 2015/0338988 A1* | 11/2015 | Lee | G06F 1/1613 |
| | | | 345/173 |
| 2015/0348591 A1* | 12/2015 | Kaps | G11B 27/17 |
| | | | 386/201 |
| 2016/0005280 A1* | 1/2016 | Laska | G08B 13/19682 |
| | | | 386/230 |
| 2016/0234436 A1* | 8/2016 | Yu | H04N 5/23238 |
| 2017/0310888 A1* | 10/2017 | Wright | H04N 5/772 |

* cited by examiner

US 10,839,856 B2

SYSTEMS AND METHODS FOR GENERATING COMPILATIONS OF PHOTO AND VIDEO DATA

CROSS-REFERENCE TO RELATED APPLICATIONS

This application claims priority to provisional application 62/306,047 titled "Systems and Methods for Generating Compilations of Photo and Video Data," filed on Mar. 9, 2016. The entire contents of the 62/306,407 application are incorporated herein by reference.

TECHNICAL FIELD

The systems and methods disclosed herein relate generally to producing recordings of events, such as in the context of indoor and outdoor sporting and adventure activities.

SUMMARY

Example embodiments relate to a computing system that allows for the efficient capture, alteration, and compilation of video segments to make a video of an activity. In some embodiments, the computing system receives a command to generate a first video of a first activity. In response to receiving the command to generate the first video, the computing system executes a first automated video processing procedure which includes receiving one or more live video feeds of the first activity from one or more cameras, where each camera provides at least one separate live video feed. Then, the computing system selects one or more of the live video feeds for processing, modifies each selected live video feed, generates one or more video segments based on the modified live video feeds, and compiles the generated video segments into a first video of the first activity.

Furthermore, because this video processing procedure is automated (or at least semi-automated), and occurs in real time (or substantially real time) while a participant is engaged in the activity, any editing and/or compilation procedures also occur during the activity and are completed at the same time, or at substantially the same time, that the participant completes the activity, so the participant and the user are able to focus on the activity, and not the recording and/or editing processes. This result saves the participant (and the user) time and effort and allows them to focus on the activity exclusively and maximizes the participant's level of satisfaction with the activity and the experience.

In some embodiments, a method is provided that includes receiving, by a computing system, a command to generate a first video of a first activity. The method further includes, in response to receiving the command to generate the first video, executing a first automated video processing procedure comprising: (i) receiving one or more live video feeds of the first activity, wherein each live video feed is obtained from a separate camera, (ii) selecting one or more of the received live video feeds for processing, (iii) for each of the selected live video feeds, modifying the selected video feed to improve performance of the first automated video processing procedure, (iv) generating a video segment based on each of the modified video feeds, and (v) compiling the one or more generated video segments into a first video of the first activity.

Some embodiments include a system comprising at least one processor and a tangible, non-transitory computer readable medium having stored therein instructions that, when executed by the at least one processor, cause the at least one processor to perform functions, including but not limited to the functions described herein. The system includes one or more user interfaces configured to receive a command to generate a first video of a first activity, wherein the first activity comprises one or more events. In operation, in response to receiving the command to generate the first video, the system executes a first automated video processing procedure comprising: (i) receiving one or more live video feeds of the first activity, wherein each live video feed is obtained from a separate camera, (ii) selecting one or more of the received live video feeds for processing, (iii) for each of the selected live video feeds, modifying the selected video feed to improve performance of the first automated video processing procedure, (iv) generating a video segment based on each of the modified video feeds, and (v) compiling the one or more generated video segments into a first video of the first activity.

It should be noted that this summary is for the purposes of illustration only. Specifically, this summary should not be read in any way as limiting to the aspects, examples, and embodiments of the claimed invention disclosed herein.

DETAILED DESCRIPTION

Figure 1:
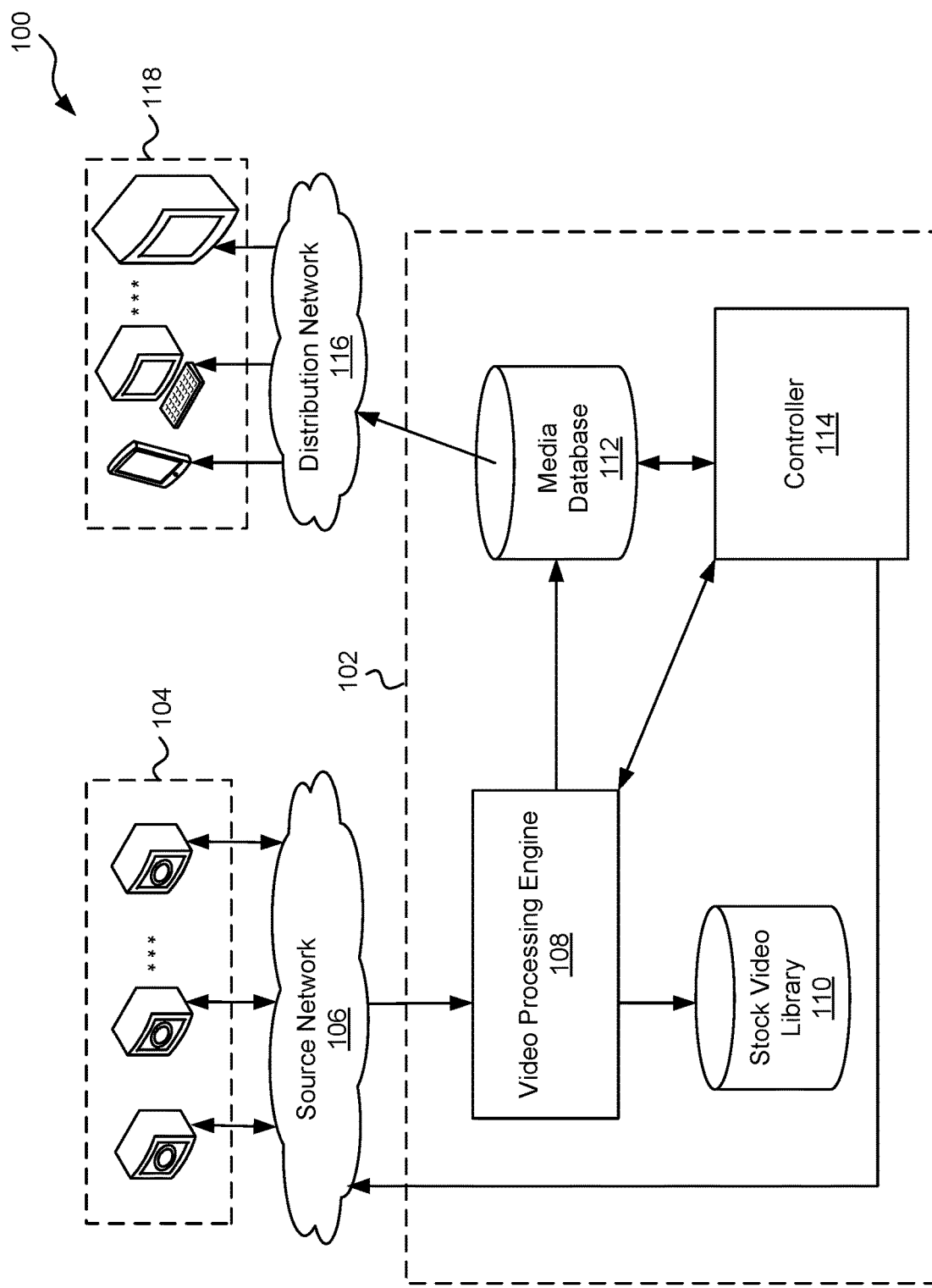
FIG. 1 depicts a system architecture, in accordance with example embodiments.

Example methods and computing systems are described herein. Any aspect, example, or embodiment described herein should not be construed as preferred or advantageous over other potential embodiments or features. Instead, it should be easily and readily understood that certain aspects of the disclosed computing systems and methods can be arranged and combined in a host of different ways.

Additionally, the arrangements reflected in the Figures should not be regarded as limiting, but instead should be viewed as examples only. Further, these examples and others could contain more or fewer of any given element, a different arrangement of those elements, and/or, the deletion of one or more of those elements and/or the addition of one or more other elements.

I. Overview

Cameras are typically used to capture video of a noteworthy event while the event is transpiring. In the context of recording indoor and outdoor sporting and adventure activities, cameras are often used to capture video while attached to one or more parts of the equipment used to facilitate the activity or activities to be captured. For example, if the activity is zip-lining, the camera may be attached to the roller gear that allows the participant to roll down the zip line, and may also be focused, statically, on the participant's face.

When used in this fashion, however, the video captured by such cameras are often non-dynamic and of a static viewpoint, which may lead to uninteresting, unnecessarily long, and/or corrupted video segments—from the perspective of the participant or others.

Even so, during the recording of such an event, the camera may also need to know when to begin or end the recording, what should be done with the recording once completed, and/or if the completed recording is compliant with one or more predetermined parameters associated with the completed recording and/or recordings in general.

Disclosed herein are systems configured to control multiple cameras and produce an auto-edited compilation of images and/or videos of an activity, as well as methods for operating the disclosed systems. Specifically, the example embodiments disclosed herein allow a computing system, once commanded to generate one or more videos of one or more activities, to accurately and efficiently carry out the tasks associated with capturing, altering, and compiling of video segments generated from live video feeds received by the computing system into a video or videos of an activity or activities.

In operation, the systems and methods disclosed herein allow the user of the computing system (typically the activity organizer) and/or the participant in the activity to focus their attention and efforts primarily on the activity—as opposed to being concerned with recording video or taking photos of such activities. Further, for context, these activities may include, but are certainly not limited to, water sports (e.g., parasailing, jet-skiing, wake-boarding, jet-packing, etc.), non-water sports (e.g., zip line tours, amusement park rides, sequential-style rides, tours, etc.), and other activities. In a further aspect, the systems and methods disclosed herein are also applicable to any activity, event, adventure sport, amusement ride, excursion tour, or similar circumstances which involves participants and where multi-captured and multi-angle footage is of benefit For example, in one scenario, the computing system is configured to receive a command to generate a video of an activity. Once the computing system receives this command, and in some instances in response to receiving the command, the computing system executes an automated video processing procedure. In some embodiments, the automated video processing procedure comprises, among other elements: receiving one or more live video feeds of the activity from one or more separate cameras, selecting and modifying one or more of the received live video feeds for processing, generating one or more video segments based on each of the modified video feeds, and then compiling the one or more generated video segments into a video of the activity.

In some embodiments, compiling the one or more generated video segments comprises combining the one or more generated video segments in a particular order. In some embodiments, the compilation may also include combining the one or more generated video segments with previously recorded stock video segments (which may include intro/outro sequences, and/or video segments of similar activities or environmental surroundings, among other possibilities) that can be interleaved, potentially seamlessly, with the generated video segments, before being compiled into a video of the activity. In a further aspect, any or all of these segments (both those that are generated and those that were previously recorded) may be altered to ensure consistency across all the segments used in the compiled video of the activity.

In other embodiments, at the completion of the activity, a copy of the video produced by the system is (or at least can be) provided to the participant, participants, or others via a variety of mediums. For example the video may be provided to one or more of these parties on a mobile storage device (e.g., a USB flash drive, a cloud-based storage system, etc.), by uploading the video to a website or physical kiosk for review and selection, uploading the video to a social media site/service associated with one of these parties, and/or transferred to a device associated with one of these parties (e.g., a camera, smart phone, tablet or other computing device), among other scenarios.

In some embodiments, the computing system automatically (or at least semi-automatically) adjusts its video capture parameters/settings, as well as the functionality of associated hardware and devices by examining one or more parameters associated with these components through the execution of one or more calibration sequences. For example, in some embodiments, the computing system obtains a calibration video segment from each camera associated with the computing system, compares the calibration video segment to a corresponding reference video segment to evaluate the level of consistency between the video segments, and then configures each camera so that video received from each camera has a consistent look and feel when initially received for processing from its respective camera, thereby reducing the amount of post-video-capture processing required for the compiled video to have a consistent look and feel across the different video segments making up the compiled video. And, in still further embodiments, the computing system automatically (or at least semi-automatically) adjusts the field of view for each (or at least some) of the associated cameras, by comparing the field of view for each camera to a corresponding reference field of view, and adjusting each camera's field of view to improve the likelihood that each camera will capture footage that includes the participants.

In other examples, the computing system, while executing a first automated video processing procedure, receives a command to generate a second video of a second activity. In response to receiving the command to generate the second video, the computing system executes a second automated video processing procedure. In some embodiments, the computing system manages the steps of the first and second automated video processing steps to ensure no critical data is lost during the execution of one or both of the automated video processes. In some examples, the computing system facilitates this management by executing the first and second automated video processing procedures at the same time (e.g., by parallel processing or other similar processing techniques), and may potentially execute a third, fourth, fifth, or more automated video processing procedures in a similar fashion.

In some embodiments, the computing system prioritizes one or more of the second automated video procedure's steps over the completion of one or more of the steps in the first automated video procedure. For example, the computing system in some embodiments prioritizes video capture steps over video editing and compilation steps, as described herein.

The embodiments described herein that are configured to select and process live video feeds from individual cameras have multiple advantages over alternative procedures that may include collecting and processing video footage captured and stored in local memory from a group of cameras.

First, because individual cameras transmit a live video feed to the computing system during the activity, camera malfunctions can be identified preferably before (or even during) the activity (e.g., if the video feed is corrupted and/or interrupted) rather than after the activity is completed. This allows the system in some embodiments to perhaps alter the video capture sequence to capture more video from two cameras adjacent to the malfunctioning camera. Although some of the footage captured from the two adjacent cameras might be less ideal than the footage that would have been captured from the malfunctioning camera, some video is better than no video.

Second, because the computing system can access a live video feed from each camera, the system in some embodiments can calibrate and adjust an individual camera's video parameters (e.g., brightness, contrast, grading, saturation, color balance, image filter parameters, and/or other parameters) periodically or semi-periodically, as described herein. In some embodiments, the calibration and adjustment procedure is performed before each new activity starts, but the calibration and adjustment could be performed with nearly any desired frequency (e.g., every 5 minutes, 10 minutes, 15 minutes, hour, 2 hours, daily, and so on). Regardless of when or how often the calibration and adjustment procedure is executed, periodically calibrating and adjusting individual cameras enables the system to capture footage with desired video/image attributes on the front end, which tends to reduce the amount of post-capture processing required to generate the final compiled video of the activity as compared to alternative approaches that might instead download video from each camera's local memory and have to process perhaps less ideal footage at a later time, perhaps after the activity is over.

Third, because individual cameras transmit a live video feed to the computing device, the computing device can process (including edit if necessary or desired) and compile video segments from the video feeds in real time, or at least in substantially real time, without the active guidance or management of the recording devices by the operator and/or user. And, because the video processing procedure is automated and occurs in real time (or substantially real time) while a participant is engaged in the activity, the video processing procedure completes any editing and compilation procedures at the same time or at substantially the same time that the participant completes the activity, so the participant and the user are able to focus on the activity, and not the recording and/or editing processes. As a result, the participant can enjoy the activity and the final video (along with perhaps sub-portions or variants thereof, including perhaps still shots of the participants engaged in the activity) can be made available to the participant(s) via any of the above-described methods when the participant has completed the activity. In operation, this results in the participant (and the user) saving time and effort and allows them to focus on the activity exclusively, while also maximizing the participant's level of satisfaction with the activity.

In a further aspect, if for sale, the participant may be more inclined to purchase a finalized video that is immediately available after completing the activity because the participant is still is still engaged in the moments of excitement immediately following the activity, which may diminish quickly. Additionally, such an inclination for purchasing the finalized video benefits the user (and any associated parties) as well as the participant (e.g., if excited about the finalized video, the participant may be more likely to buy other related products from the user, submit positive reviews concerning their impressions of the activity and/or the user, upload/post the finalized video on social media sites (thereby promoting the activity and/or the user, among other such possibilities).

Other advantages of the systems and methods disclosed herein will become apparent to those of skill in the art upon review of the figures and following detailed description.

II. System Architecture

In the following sections, references will be made, in some detail, to various embodiments of the systems and methods disclosed herein. Although the following detailed descriptions provide many details to provide a context to ensure a full understanding of the present disclosure for the reader, these descriptions should not be viewed as limitations. Further, the disclosed systems and methods may be accomplished without all of these specific details.

FIG. 1 shows a system 100, in accordance with example embodiments. More specifically, system 100 includes one or more cameras 104 in communication with a computing system 102 via a source network 106 and one or more destination devices 118 in communication with the computing system 102 via a distribution network 116. In a further aspect, in this example, computing system 102 includes one or more video processing engines 108, a stock video library 110, a media database 112, and a controller 114. Furthermore, in some embodiments, one or more of these components may be encased in one or more weatherproof units.

In some embodiments, controller 114 comprises one or more processors programmed with the software that, when executed by the one or more processors, causes or otherwise enables the controller 114 to communicate with and/or control one or more other components in computing system 102 and/or system 100. For example, in some embodiments, controller 114 communicates with one or more cameras 104 via a source network 106.

In some embodiments, in response to a command to generate a video of an activity, controller 114 selects one or more live video feeds received from the one or more cameras 104. In some embodiments, each live video feed is obtained by an individual camera. In operation, controller 114 can communicate with the one or more cameras 104 via the source network 106 in one or more of a variety of ways. For example, this communication may be accomplished via wired connections (e.g., High-Definition Multimedia Interface (HDMI) cables, coaxial cables, Ethernet cables, or any other suitable wireline communication technology now known or later developed) and/or wireless connections (e.g., WIFI, VHF or UHF radio frequencies, or other suitable wireless technologies now known or later developed), among other possibilities.

Additionally, in some embodiments, source network 106 also contains one or more switching devices controlled by the controller 114, facilitating which live video feeds are passed from the one or more cameras 104 to the computing system 112 at any given time.

For example, in embodiments where the one or more cameras 104 are connected to the computing system 102 via HDMI cables, the source network 106 includes an HDMI switch (not shown), where the HDMI switch has one input for each of the one or more cameras 104, and at least one output to the computing system 102. In operation, the controller 114 controls which of the live video feeds on each of the HDMI inputs from each camera are passed to the HDMI output(s) to the computing system 102 for processing according to the methods and procedures disclosed and described herein. In some embodiments, the above-described HDMI switch may be a separate component of the source network 106 or an integrated component of the computing system 102.

In another example, rather than controlling an HDMI switch (or other type of switch) configured to implement a switching scheme for passing one or more live video feeds to the computing system for processing, the controller may instead directly control the one or more cameras 104 to cause each camera to transmit a live video feed to the computing system at particular times. In yet another example, each camera is configured to transmit a live video feed via a wireless or wireline network to the computing system 102 on a separate physical or virtual channel (e.g., a separate RF channel in a frequency division multiplexed (FDM) scheme, a separate time slot channel in a time division multiplexed (TDM) scheme, a separate source IP address, e.g., the camera's IP address, in a video over IP scheme) and the controller is configured to tune or otherwise configure a physical or virtual receiver (not shown) of the computing system 102 to receive and process one or more of the live video feeds at a particular time.

In a further aspect, in order to determine which one or more live video feeds captured by one or more cameras 104 are selected for further processing, the controller in some embodiments relies on a set of predetermined instructions (e.g., a script that the processors of the controller execute) and/or user input received via controller 114. In the context of receiving user input, in some embodiments, controller 114 contains a touch-sensitive display screen displaying one or more graphical user interfaces ("GUIs") comprising one or more command graphics. In operation, the command graphics displayed on the display screen enable the operator to control the computing system.

For example, in some embodiments, in response to receiving user input, the computing system executes an automated (or at least semi-automated) video processing procedure. In other embodiments, however, the computing system may be additionally or alternatively controlled by the manual command graphics, which may include, for example, a live video feed selection command graphic that allows the user to select one or more live video feeds for processing, and/or start and stop command graphics that, when touched by the user, begin and stop, respectively, the automated video processing procedure. In other embodiments, the computing system may receive commands via a wireless command device (e.g., a remote controller), one or more voice or visual recognition devices configured to recognize voice and/or visual commands (e.g., microphones and/or cameras with accompanying software that recognizes voice or visual commands), and/or other input devices and/or technologies.

In still other embodiments, once the one or more received live video feeds are selected for processing, those feeds are received by a video processing engine 108 that processes the received live video feeds in one or more ways. In one example, the video processing engine modifies the selected live video feed(s) to improve the performance of the computing system in connection with performing the automated video processing procedure. In some embodiments, this modification may include, among other possibilities, compressing the selected video feed(s) to reduce the processing load for generating the compiled video, among others.

In a further aspect, once a selected live video feed has been modified, the video processing engine 108 generates one or more video segments based on one or more of the modified video feeds, which may include a variety of video processing techniques (e.g., recording the video segment in real time and saving it in one or more formats).

In yet another aspect, video processing engine 108 compiles the one or more generated video segments into a video of the activity in a variety of ways.

For example, in some embodiments, video processing engine 108 compiles the one or more generated video segments into the video of the activity by combining the one or more generated video segments into the video of the activity with no further editing or input. In other embodiments, however, video processing engine 108 selects one or more stock video segments from stock video library 110, interleaves the selected stock video segments with the generated video segments, and then compiles both the stock and generated video segments into the video of the activity.

In some embodiments, the computing system 102 (or one or more components thereof) selects the stock video segments based on input received from the user via controller 114. For example, the user may provide information for the video processing engine 108 via the controller 114, which may inform the video processing engine's selection of the stock video segments. More specifically, the user may provide information regarding one or more relevant factors concerning system 100 (e.g., current weather conditions or other environmental information), which may influence the video processing engine's selection of the stock video segments (e.g., if it is cloudy/overcast, the video processing engine may select only the stock video segments that reflect cloudy/overcast conditions).

In further examples, video processing engine 108 may also alter the selected stock video segments, the generated video segments, or both, to achieve a consistent look across the stock and generated segments, wherein all the segments appear to be footage of the captured activity.

In a further aspect, once the video of the activity has been completed and the video is ready to be transferred, the video may be sent (via the video processing engine 108 or the controller 114) to the media database 112. In one example, media data base 112 may serve as both a repository for finished videos (e.g., a storage device for such videos), output interface (e.g., network interface), or both. In a further aspect, the media database 112 may also facilitate communication between one or more destination devices 118 and the computing system 102 via a distribution network 116, wherein this communication may be controlled by the controller 114 (e.g., by user input), the video processing engine 108 (e.g., by referencing a predetermined script), or some combination thereof.

Under either scenario, in example embodiments, similar to communications via source network 106, communications with the one or more destination devices 118 (e.g., mobile devices, computing devices, kiosks, and/or other devices associated with the user, the participant, or another party) via the destination network 116 may be accomplished in a variety of ways (e.g., via wired, wireless, and/or other transmission technologies). In some embodiments, the video may transferred to a SD/USB medium or other tangible memory media. In other embodiments, the video may be uploaded to a website for later download by a party, such as the activity participant. In other embodiments, the video may also be transferred via distribution network 118 to a participant's portable electronic device (e.g., camera, smart phone, tablet computer, or other portable electronic device).

III. Computing Device

Figure 2:
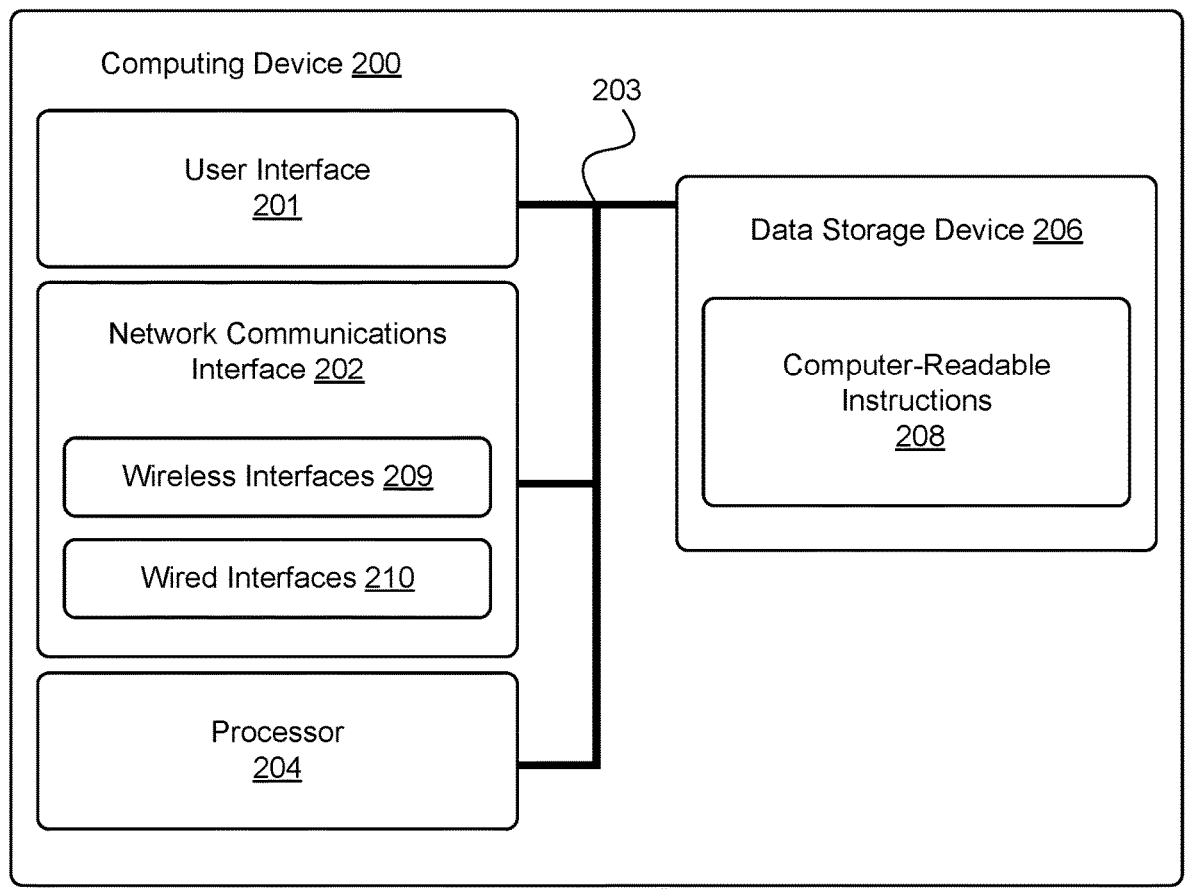
FIG. 2 depicts an example computing device, in accordance with example embodiments.

FIG. 2 illustrates computing device 200 in accordance with example embodiments, which may be configured to perform at least one function of computing system 102, as previously described.

Computing device 200 includes one or more user interfaces 201, a network-communication interface 202, one or more processors 204, and a data storage device 206 with computer-readable instructions 208 stored thereon, all of which may be linked together by a connector 203, such as a system bus or similar mechanism.

In operation, the user interface 201 may be configured to receive and/or convey information and/or data to/from a user. In one example, the user interface 201 is a touch screen that displays one or more graphical user interfaces to receive and convey information from and to the user. In other examples, the user interface 201 receives information and/or data from a user through the use of a computer mouse, a keyboard, one or more cameras, and/or one or more microphones (which may also work in connection with voice recognition software), among other such devices. In other examples, the user interface 201 is configured to convey information and/or data to a user through the use of display devices (which may include LCD, LED, and/or plasma, among other, screens, and/or other similar devices, either now known or later developed) and/or speakers (or an audio output port configured to send an audio signal to an external device), among other similar devices.

Computing device 200 also includes one or more network-communications interfaces 202, which may comprise one or more wireless interfaces 209 and/or one or more wired interfaces 210, both or either of which may be configured to communicate via a network. For example, wireless interfaces 209 may include wireless receivers, wireless transmitters, and/or wireless transceivers, one or more of which may employee technologies such as Bluetooth, WIFI, and/or other similar types of similar technologies. In other examples, wired interfaces 210 may include one or more wired receivers, wired transmitters, and/or wired transceivers, one or more of which may employee technologies such as coaxial, Ethernet, USB, and/or other similar types of similar technologies.

In some example embodiments, the wired interfaces 210 include one or more HDMI interfaces, where each HDMI interface is configured to receive a live video feed from one of the one or more cameras 104 shown and described in FIG. 1.

Computing device 200 also includes one or more processors 204, which are configured to execute computer-readable program instructions 208 that are contained in data storage 206 and/or other instructions as described herein. In operation, the one or more processors 204 are configured to execute the software for controlling the other components of computing device 200.

Computing device 200 also includes one or more data storage devices 206, one or more of which may include one or more computer-readable storage media that can be read and/or accessed by the at least one or more processors 204. In a further aspect, one or more data storage devices 206 can also contain, among other data, computer-readable program instructions 208. And, in some embodiments, data storage 206 can additionally include instructions required to perform at least part of the methods and method steps described herein. In some embodiments, the one or more data storage devices 206 are also configured to store (at least temporarily) one, more, or all of the received live video feeds from the one or more cameras 104, the video segments derived from the live feeds, the stock video library, altered stock and/or generated video segments, and compiled videos generated by the computing system 102.

III. Method Flowchart and Example Embodiments

Figure 3:
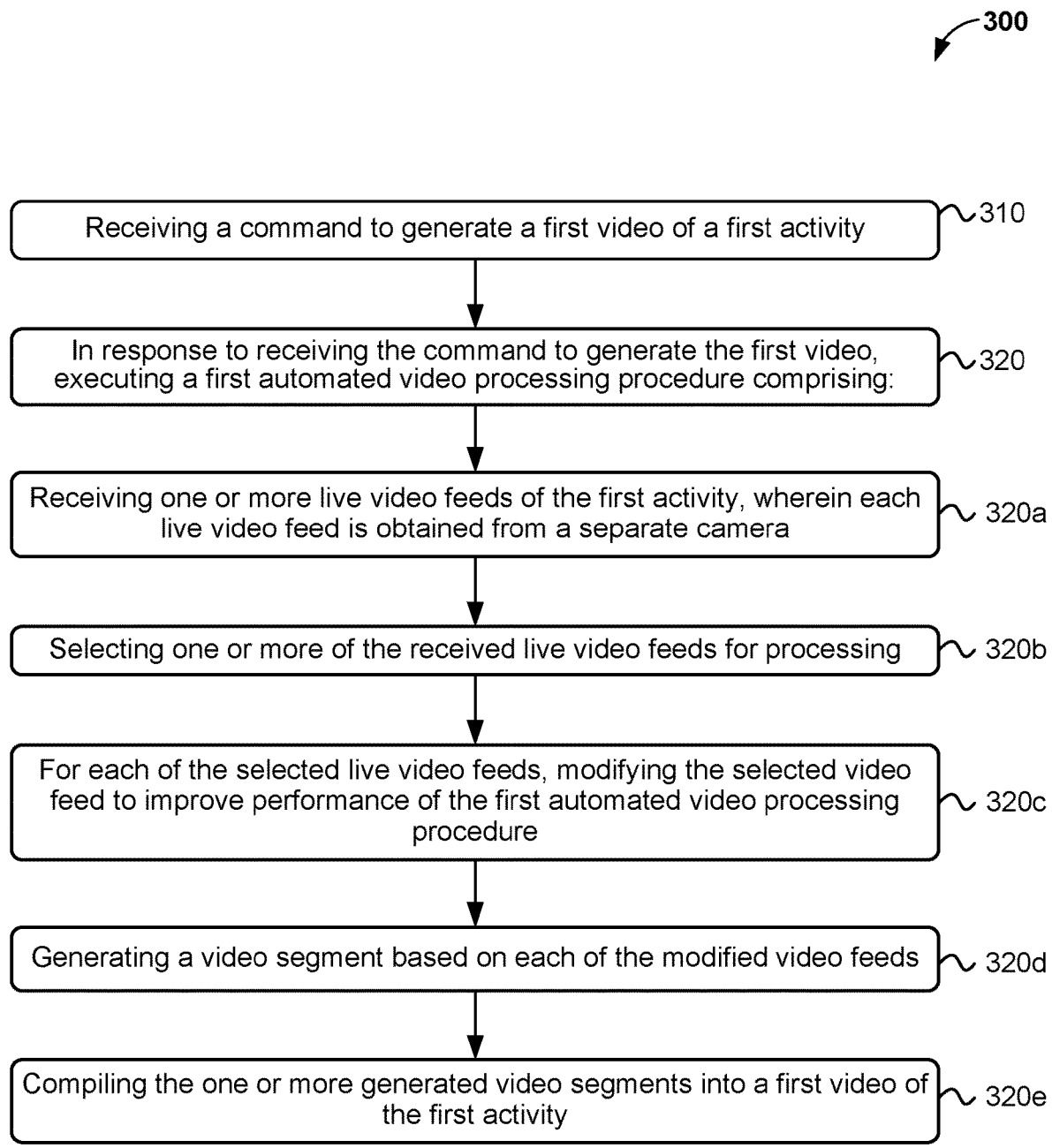
FIG. 3 is a flowchart of a method, in accordance with example embodiments.

FIG. 3 illustrates a flowchart showing an example method 300 executed by the computing system to capture, alter, and compile video segments into a first video of a first activity. Method 300 may be carried out by one or more computing devices, such as computing system 102 and/or computing device 200, as illustrated and described with respect to FIGS. 1 and 2. In additional examples, method 300 may be carried out by computing system 102 and/or computing device 200, operating as part of a cloud-based computing system. Additionally, method 300 may be performed by one or more other types of computing systems and devices other than those illustrated in FIGS. 1 and 2.

Further, the functionality described in connection with the flowcharts described herein can be implemented via one or more parts or components of the computing systems and computing devices illustrated in FIG. 1 (e.g., video processing engine 108 and/or controller 114) and/or FIG. 2 (e.g., processors 204 and/or data storage device 206 with computer-readable instructions 208).

Moreover, for each block of the flowchart illustrated in FIG. 3, the circuitry and/or components shown in and described with reference to FIGS. 1 and 2 allows each block to be performed under the functionality of the specific component, as well as part of the functionality of the device on which the specific component is implemented. Further, the blocks of the flowchart illustrated in FIG. 3 may be executed in or out of the order shown, as long as the overall functionality of the described method is maintained.

At block 310, method 300 includes receiving a command to generate a first video of a first activity. In some embodiments, the computing system receives the command from a user via a user interface, as illustrated in FIGS. 1 and 2. Additionally, this command to generate a video of an activity may be in the first instance (e.g., a first video of a first activity), in an addition to another command to generate a video of an activity (e.g., a second video of a second activity during or after the system has been commanded to generate a first video of a first activity), or some other similar scenario.

In general, the computing system is configured to recognize certain commands that are commonly associated with generating a video of an activity, which may be relayed to the computing system from the user via a user interface implemented on the computing system. In an example, the computing system may receive the command to generate a first video of a first activity via a GUI displayed on a display screen of a controller. In a further aspect, this GUI may comprise one or more command graphics reflecting means by which a variety of related parameters may be controlled by the user (e.g., buttons, switches, sliders, etc.). In example embodiments, these command graphics enable the user to control the computing system by interacting with the command graphics in one or more ways (e.g., touching the command graphics displayed on the display screen and/or controller). In other embodiments, the computing system may receive commands via a wireless command device (e.g., a remote controller), one or more voice or visual recognition devices configured to recognize voice and/or visual commands (e.g., microphones and/or cameras with accompanying software that recognizes voice or visual commands), and/or other input devices and/or technologies.

In other aspects, in response to receiving a command to generate a video of an activity, the computing system performs one or more aspects of an automated (or at least semi-automated) video processing procedure. In some embodiments, after the computing system receives a command to generate a video of an activity, the user may not interact with the computing system again until the automated video processing procedure is completed. In other examples, however, after the computing system receives a command to generate a video of an activity, the user may command the computing system to undertake other tasks in spite of the non-completion of the automated video processing procedure already initiated by the computing system.

For example, during an automated video processing procedure concerning a first video of a first activity, the user may command the computing to undertake a variety of additional tasks. In one example, the user may command the computing system (via displayed command graphics or otherwise), to pause, stop, or discontinue the automated video processing procedure concerning the first video of the first activity video. In another example, while executing the first automated video processing procedure, the user may command the computing system to generate a second video of a second activity. In another example, the user may command the computing system (via displayed command graphics or otherwise) to capture an image or images from the one or more live video feed or take a photo during the activity; and, in response, the computing system saves the selected images in one or more places (e.g., a virtual folder).

At block 320, method 300 further includes, in response to receiving the command to generate the first video, executing a first automated video processing procedure. In operation, the video processing procedure engages the computing system to perform a variety tasks that cause the computing system to capture, alter, and compile video segments into a video of an activity.

For example, at block 320a, method 300 includes receiving one or more live video feeds of the first activity. In some but not all embodiments, each live video feed is obtained from a separate camera. In operation, the computing system may receive one or more live video feeds using devices and systems such as those illustrated in FIGS. 1 and 2. In some embodiments, the computing system does not need to request the separate cameras to begin recording or transmitting video. Instead, the computing system obtains the one or more live video feeds by receiving live video feeds for one or more separate cameras that are each transmitting live video feeds to the source network 106 (FIG. 1).

At block 320b, method 300 includes selecting one or more of the received live video feeds for processing. In particular, the computing system may select one or more live video feeds received from each of the separate cameras based on referencing a predetermined script, user input, or a combination of the two.

In some embodiments, the computing system may select one or more live video feeds based on a predetermined script that directs the computing system to select the one or more live video feeds. In some embodiments, the selection may additionally be based on one or more predetermined metrics. For example, the computing system may select the one or more live video feeds based on a set of time-based intervals. More specifically, once the user commands the computing system to generate a first video, the computing system references a script (via controller 114 and/or via computer-readable instructions 208 stored on the data storage device 206 of computing device 200) that directs the computing system to select a live video stream from a first camera for 20 seconds, then select a live video stream from a second camera for 20 seconds, and then select a live video stream from a third camera for 20 seconds. In a further aspect, this script may direct the computing system to select each of these three cameras for this duration sequentially, simultaneously, or in some other order.

In some embodiments, the computing system selects one or more live video feeds in response to one or more inputs from the user directing the computing system to select one or more specific live video feeds. For example, once the user commands the computing system to generate a first video, the computing system then references a script directing the computing system to select a live video stream from one or more cameras for one or more predetermined durations. During the execution of this script, however, the user may decide that a live video from a camera not being employed by the computing system may provide better footage. Accordingly, the user may provide input to the computing system to select the user's choice of the live video feeds over those indicated by the script. In response to receiving the user's input, the computing system discontinues (or at least temporarily suspends) executing the script (for some predetermined interval or altogether) or continues executing the script while also selecting additional live video feeds based on the user's input. Other scenarios where the computing system stops or at least temporarily suspends execution of one or more functions of the automated video processing script in response to receiving user commands are certainly possible as well.

At block 320c, method 300 further includes, for each of the selected live video feeds, modifying the selected video feed to improve performance of the first automated video processing procedure. In particular, the computing system may modify the one or more selected live video feeds in one or more ways that improve the computing system's ability to accurately and efficiently execute the automated video procedure.

For example, in some embodiments, the computing system modifies the one or more selected video feeds by one or more data processing techniques, filters, and/or similar technologies. For example, to improve performance of the automated video processing procedure, the computing system may compress the one or more selected video feeds individually, as a group, or by some other categorization. More particularly, the computing system may compress these selected live video feeds by reducing the overall file size. In other examples, the file size of the live video feeds may be compressed by converting portions of the live video feeds to different file or video formats, which may be advantageous in scenarios where a preferred format for transmission from a camera to the computing system may be different than a preferred format for video processing by the computing system. In other embodiments, the computing system may modify the selected video feed in other ways (e.g., re-encoding, motion blur reduction, color/contrast adjustments, culling mechanisms, etc.).

In another example, the computing system may modify the one or more selected video feeds by selecting only a portion of the received live video feed or the video segment that is eventually generated for incorporation into the finalized video of compiled video segments. More particularly, the computing system may select this portion of the received live video feed or the generated video segment based on some predetermined script, user input, and/or other similar techniques or considerations.

At block 320d, method 300 further includes generating a video segment based on each of the modified video feeds. In particular, the computing system may generate one or more video segments based on each of the modified video feeds and save those generated video segments in a variety of formats. For example, the computing system may generate video segments in Video MPUs (.MPU), Audio Video Interleave (.AVI) format, Flash Video (.FLV) format, Windows Media Video (.WMV) format, Apple QuickTime Movie (.MOV) format, Moving Pictures Expert Group 4 (.MP4) format, and/or other similar video formats, depending on the specific scenario for which the computing system will ultimately utilize the one or more generated video segments.

At block 320e, method 300 further includes compiling the one or more generated video segments into a first video of the first activity. In particular, the computing system may compile the one or more generated video segments into a first video of a first activity by combining the one or more generated video segments directly (e.g., stitching the one more generated video segments together in a particular order) and/or in combining them with other video segments (e.g., previously recorded stock video segments).

For example, in some embodiments, the computing system may compile three 20-second video segments generated from three separate live video feeds (e.g., a first camera, a second camera, and a third camera) directly into a 60 second video containing the three 20-second video segments in a particular order (e.g., the 20-second video segment from the first camera, then the 20-second video segment from the second camera, then the 20-second video segment from the third camera).

In other embodiments, the computing system may compile three 20-second video segments generated from three separate live video feeds (e.g., a first camera, a second camera, and a third camera) with one or more interleaved stock video segments selected from a library of previously recorded stock video segments. In other examples, the computing system may compile some portion of each or one of the three generated 20-second video segments with one or more interleaved stock video segments. Under either scenario, interleaving a least a portion of the one or more generated video segments with one or more stock video segments results in a compiled video that depicts an ordered sequence of events that is representative of the captured activity.

In a further aspect, in one example, one or more of the selected stock video segments and/or one or more of the generated video segments may be altered by the computing system so that all the segments appear to be footage from the captured activity. Specifically, one or both of these video segment types may be altered by adjusting the playback speed of the video segments, and/or one or more of the following parameters associated with the video segments: brightness, contrast, grading, saturation, color balance, or image filter parameters. Under any of these scenarios, however, by adjusting these parameters, the computing system may achieve a more consistent look/visual appearance across all of the video segments.

In another example, the stock video segments may be selected from a library of stock video segments reflecting a variety of environmental conditions (e.g., bright sunshine, overcast/cloudy conditions, rain, river levels, etc.). And, in a further aspect, these stock video segments may be selected (based on previously-received indication of environmental conditions for the captured activity of otherwise) for their consistency with environmental conditions associated with the generated video segments, further improving consistency between all of the video segments.

IV. Further Example Embodiments

In other embodiments, the methods described herein may further include displaying the one or more received live video feeds on the user interface of the computing system, among other possibilities. In a further aspect, because each displayed live video feed is obtained from a separate camera, this information may be helpful for the user to review.

In other embodiments, the methods described herein may further include the computing system selecting a set of images from one or more of the received live video feeds and/or one or more of the video segments generated by the computing system. In a further aspect, the selection of these images may be based on: a predetermined script the computing system may reference (e.g., selecting an image at the top of every second over a 20-second video segment), input from the user (e.g., user input indicating the selection of one or images displayed on the computing system as part of a displayed live video feed), and/or some other related technology or system input. In a further aspect, the computing system may also save the selected images in one or more places (e.g., a virtual folder).

In other examples, the methods described herein may further include the computing system storing a copy of the finalized video (e.g., the first video of the first activity) in a tangible, non-transitory readable memory of the computing system. In a further aspect, the storage of this video may be duplicative (e.g., storing a first copy of the video in a first tangible, non-transitory computer-readable memory of the computing system and storing a second copy of the video in a second tangible, non-transitory computer-readable memory of a separate computing system).

In a further aspect, a copy of this video may be provided to a participant of the captured video in a variety of ways, including: stored on a mobile storage device (e.g., a USB flash drive, a cloud-based storage system, etc.), uploading the video to a website or physical kiosk for the participant's review and selection, uploading the video to a social media site/service associated with the user, the participant, or some other party, or transferred to a device associated with the user, the participant, or some other party (e.g., a camera, smart phone, tablet or other computing device), among other scenarios. Additionally, although such duplicative transfer and/or storage may improve convenience for the user, the participant, or some other party, these copies may also be used as backup redundant copies in the event of a failure or destruction of one of the aforementioned devices. Further, although these example embodiments generally relate to one activity participant, they apply to groups of activity participants as well (e.g., for a group of ten participants, there may be ten videos and/or related media created and transmitted via WIFI to a kiosk at visitation center, where all ten participants may review and/or purchase placed one or more of the aforementioned finalized product).

In yet another example, the methods described herein may include the computing system, while executing the first automated video processing procedure, receiving a command to generate a second video of a second activity. In response, the computing system may execute a second automated video processing procedure, which may include: receiving one or more live video feeds of the second activity, selecting one or more of the received live video feeds for processing, modifying each of the selected video feeds to improve performance of the second automated video processing procedure, generating a video segment based on each of the modified video feeds, and compiling the one or more generated video segments into a second video of the second activity. As described herein, in some embodiments, modifying a selected video feed to improve performance of the video processing procedure includes compressing and/or changing the format of video data obtained from the live video feed.

In a further aspect, the computing system may also manage the steps of the first and second automated video processing steps to reduce the likelihood that critical data might be lost during the execution of one or both of the automated video processes. For example, the computing system may facilitate this management by executing the first and second automated video processing procedures at the same time (e.g., by parallel processing or other similar processing techniques), and may potentially execute a third, fourth, fifth, or more automated video processing procedures in a similar fashion.

In other examples, the computing system may prioritize one or more of the second automated video procedure's steps over the completion of one or more of the steps in the first automated video procedure. In these examples, in general, the highest priority steps of the first and second automated video processing procedures relate to capture, with lower priority given to the steps relating to processing and/or editing captured video. For example, in some embodiments, the computing system prioritizes execution of the second automated video procedure's step of receiving one or more live video feeds of the second activity over one or more of the first automated video processing procedure's steps of (i) selecting one or more of the received live video feeds, (ii) modifying each selected video feed, (iii) generating one or more video segments, and (iv) compiling the one or more generated video segments into the first video of the first activity.

In some embodiments, this prioritization includes suspending execution of one or more the first automated video processing procedure's steps of (i) selecting one or more of the received live video feeds, (ii) modifying each selected video feed, (iii) generating one or more video segments, and (iv) compiling the one or more generated video segments into the first video of the first activity until completion of the second automated video processing procedure's step of receiving one or more live video feeds of the second activity.

In other embodiments, the methods described herein may include the computing system calibrating its functionality, as well as the functionality of associated hardware and devices, before, during, or after engaging in the steps of other methods described herein by undertaking a variety of testing sequences.

For example, to ensure the consistency and functionality of the live video feeds received and/or the video segments generated therefrom, the computing system may engage in a calibration sequence. Specifically, the computing system may obtain a first calibration video segment from each camera associated with the computing system and then compare the first calibration video segment to a corresponding reference video segment. In a further aspect, the computing system may also determine one or more camera configuration parameters (e.g., brightness, contrast, saturation, color balance, filters, and/or other parameters) to achieve consistency between the video segments and then configure each camera with one or more of the determined parameters. In yet a further aspect, to ensure this consistency, the computing system may repeat this procedure (potentially more than once) over the term of use of the system, and may also display one or more of the camera's corresponding first calibration video segment, a second calibration video segment, the reference video segments, and/or one or more notifications identifying problems (e.g., defective components) for the user's review.

In other embodiments, this calibration sequence may also be performed by referencing one or more stock video segments. Specifically, in response to selecting one or more stock video segments from a library of previously recorded stock video segments, the computing system may obtain a first calibration video segment from each camera associated with the computing system and then compare the first calibration video segment to a corresponding reference stock video segment. In a further aspect, the computing system may also determine one or more camera configuration parameters (e.g., brightness, contrast, saturation, color balance, filters, and/or other parameters) to achieve consistency between the video segments and then configure each camera with one or more of the determined parameters. In yet a further aspect, to ensure this consistency, the computing system may repeat this procedure (potentially more than once) over the term of use of the system, and may also display one or more of the camera's corresponding first calibration video segment, a second calibration video segment, the reference stock video segments, and/or one or more notifications identifying problems (e.g., defective components) for the user's review.

In other embodiments, the computing system may ensure its functionality, as well as the functionality of the associated cameras by comparing, for each separate camera, that camera's field of view against a corresponding reference field of view. In a further aspect, in response to undertaking the comparison, the computing system may adjust one or more individual camera's field of view to ensure consistency between that camera's field of view and its corresponding reference field of view. In yet a further aspect, after adjusting each separate camera's field of view, for each camera, the computing system may display (via the user interface of the computing system or otherwise) one or more camera's adjusted field of view and/or its corresponding reference field of view for the user's review, allowing the user to visually confirm capture timings and other parameters of the system and adjust the camera angles to optimize the resulting quality of the videos produced therefrom.

Finally, while it is true that a number of the aspects, examples, and embodiments of the claimed invention have been disclosed herein, it is also true that other aspects, examples, and embodiments of the claimed invention will be readily apparent to those skilled in the art. Accordingly, the aspects, examples, and embodiments of the claimed invention disclosed herein are provided for the purpose of explanation only, and should not be interpreted to be limiting. Instead, the most accurate and true scope of the claimed invention are captured in the following claims.

What is claimed is:

1. A method implemented by a computing system, the method comprising:
   receiving a command to generate a first video of a first activity;
   in response to receiving the command to generate the first video, executing a first automated video processing procedure comprising: (i) receiving one or more live video feeds of the first activity, wherein each live video feed of the first activity is streamed in real-time to the computing system from a corresponding camera of a plurality of separate cameras during a period in which the first activity is performed, (ii) selecting one or more of the received live video feeds of the first activity for processing according to a script, wherein the script controls the computing system to select, during the activity, a first live video stream from a first camera at a first time and for a first duration, and to subsequently select, during the activity, a second live video stream from a second camera at a second time and for a second duration, (iii) for each of the selected live video feeds of the first activity, modifying the selected video feed of the first activity as the live video feed is streamed to improve performance of the first automated video processing procedure, (iv) generating a video segment of the first activity based on each of the modified video feeds of the first activity, and (v) compiling the one or more generated video segments of the first activity into a first video of the first activity;

while executing the first automated video processing procedure, receiving a command to generate a second video of a second activity;

in response to receiving the command to generate the second video of the second activity, executing a second automated video processing procedure comprising: (i) receiving one or more live video feeds of the second activity, wherein each live video feed of the second activity is obtained from a separate camera, (ii) selecting one or more of the received live video feeds of the second activity for processing, (iii) for each of the selected live video feeds of the second activity, modifying the selected video feed to improve performance of the second automated video processing procedure, (iv) generating a video segment of the second activity based on each of the modified video feeds of the second activity, and (v) compiling the one or more generated video segments of the second activity into a second video of the second activity; and in response to executing the second automated video processing procedure, prioritizing execution of the second automated video procedure's step of receiving one or more live video feeds of the second activity over one or more of the first automated video processing procedure's steps of (i) selecting one or more of the received live video feeds of the first activity, (ii) modifying each selected video feed of the first activity, (iii) generating one or more video segments of the first activity, and (iv) compiling the one or more generated video segments of the first activity into the first video of the first activity.

2. The method of claim 1, wherein compiling the one or more generated video segments of the first activity into a first video of the first activity further comprises:

selecting one or more stock video segments from a library of previously recorded stock video segments; and interleaving a least a portion of the one or more generated video segments of the first activity with at least a portion of one or more stock video segments, thereby causing the first video to depict an ordered sequence of events representative of the first activity.

3. The method of claim 2, further comprising altering the stock video segments so that the one or more generated video segments of the first activity and the one or more stock video segments all appear to be footage from the first activity.

4. The method of claim 3, wherein altering the stock video segments so that the one or more generated video segments of the first activity and the one or more stock video segments all appear to be footage from the first activity comprises: adjusting playback speed and/or one or more brightness, contrast, grading, saturation, color balance, or image filter parameters to achieve a consistent look across the one or more generated video segments of the first activity and the one or more stock video segments.

5. The method of claim 2, further comprising altering the one or more generated video segments of the first activity and the one or more stock video segments so that the one or more generated video segments of the first activity and the one or more stock video segments all appear to be footage from the first activity.

6. The method of claim 5, wherein altering the generated video segments of the first activity and the stock video segments so that the one or more generated video segments of the first activity and the one or more stock video segments all appear to be footage from the first activity comprises: adjusting playback speed and/or one or more brightness, contrast, grading, saturation, color balance, or image filter parameters to achieve a consistent look across the one or more generated video segments of the first activity and the one or more stock video segments.

7. The method of claim 2, wherein the library of stock video segments includes individual stock video segments recorded in different environmental conditions, and wherein selecting one or more stock video segments from the library comprises selecting stock video segments recorded in the same environmental conditions as the one or more generated video segments of the first activity.

8. The method of claim 2, wherein selecting one or more stock video segments from a library of previously recorded stock video segments comprises: selecting one or more stock video segments from the library of previously recorded stock video segments based on a previously-received indication of environmental conditions for the first activity.

9. The method of claim 2, further comprising:

in response to selecting one or more stock video segments from a library of previously recorded stock video segments, for each separate camera, obtaining a first calibration video segment from each separate camera; and for each first calibration video segment from each separate camera, (i) comparing the first calibration video segment to a corresponding reference stock video segment, (ii) determining one or more camera configuration parameters to achieve a consistent look between the first calibration video segment and the corresponding reference stock video segment, and (iii) configuring the separate camera that recorded the first calibration video segment with the determined one or more camera configuration parameters.

10. The method of claim 9, further comprising, after configuring each separate camera with its determined one or more configuration parameters:

obtaining a second calibration video segment from each separate camera; and for each separate camera, displaying one or more of the camera's corresponding first calibration video segment, second calibration video segment, and reference video segment to a user for review.

11. The method of claim 1, further comprising:

selecting a set of images from one or more of the one or more generated video segments of the first activity or the one or more generated video segments of the second activity; and saving the set of images in a first collected images folder.

12. The method of claim 1, wherein for each of the selected live video feeds of the first activity, modifying the selected video feed of the first activity to improve performance of the first automated video processing procedure further comprises:

one or more of (i) compressing a received live video feed of the first activity and (ii) selecting a portion of the received live video feed of the first activity or the generated video segment for incorporation into the first video.

13. The method of claim 1, further comprising:

storing a first copy of the first video of the first activity in a first tangible, nontransitory computer-readable memory of the computing system;

storing a second copy of the first video of the first activity in a second tangible, nontransitory computer-readable memory of a separate computing system; and providing one of the first copy or the second copy of the first video to a participant of the first activity.

14. The method of claim 1, wherein in response to executing the second automated video processing procedure, prioritizing execution of the second automated video procedure's step of receiving one or more live video feeds of the second activity over one or more of the first automated video processing procedure's steps of (i) selecting one or more of the received live video feeds of the first activity, (ii) modifying each selected video feed of the first activity, (iii) generating one or more video segments of the first activity, and (iv) compiling the one or more generated video segments of the first activity into the first video of the first activity comprises:

suspending execution of one or more the first automated video processing procedure's steps of (i) selecting one or more of the received live video feeds of the first activity, (ii) modifying each selected video feed of the first activity, (iii) generating one or more video segments of the first activity, and (iv) compiling the one or more generated video segments of the first activity into the first video of the first activity until completion of the second automated video processing procedure's step of receiving one or more live video feeds of the second activity.

15. The method of claim 1, further comprising:
obtaining a first calibration video segment from each separate camera; and for each first calibration video segment from each separate camera, (i) comparing the first calibration video segment to a corresponding reference video segment, (ii) determining one or more camera configuration parameters to achieve a consistent look between the first calibration video segment and the corresponding reference video segment, and (iii) configuring the separate camera that recorded the first calibration video segment with the determined one or more camera configuration parameters.

16. The method of claim 15, further comprising, after configuring each separate camera with its determined one or more configuration parameters:
obtaining a second calibration video segment from each separate camera; and for each separate camera, displaying one or more of the camera's corresponding first calibration video segment, second calibration video segment, and reference video segment to a user for review.

17. The method of claim 1, further comprising:
for each separate camera, comparing that camera's field of view against a corresponding reference field of view and adjusting that camera's field of view to match the corresponding reference field of view.

18. The method of claim 17, further comprising, after adjusting each separate camera's field of view to match the reference field of view: for each separate camera, displaying one or more of the camera's adjusted field of view and the reference field of view to a user for review.

19. The method of claim 1 further comprising displaying the one or more received live video feeds of the first activity, wherein each live video feed is obtained from a separate camera, to a user for review.

20. The method of claim 19, further comprising:
receiving, from the user, a selection of an image in one or more of the displayed live video feeds; and saving the selected image in a displayed images folder in response to receiving the selection of the image in the one or more displayed live video feeds.

* * * * *